Aug. 11, 1964 W. T. HEDLUND 3,144,213
WASTE DISPOSER MOUNT AND HOUSING
Filed July 17, 1961 2 Sheets-Sheet 1

INVENTOR
WALTER T. HEDLUND
BY C. G. Stratton
ATTORNEY

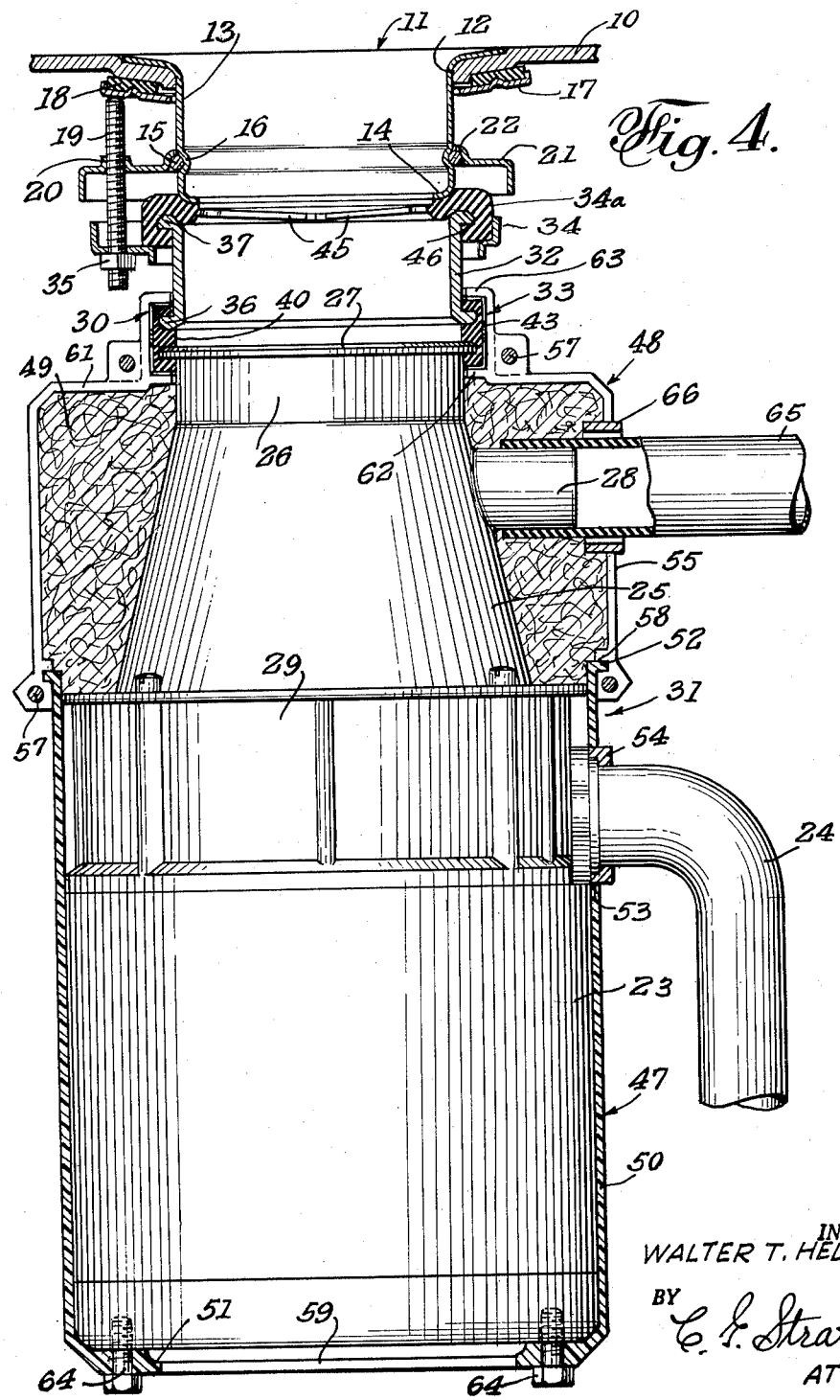

United States Patent Office 3,144,213
Patented Aug. 11, 1964

3,144,213
WASTE DISPOSER MOUNT AND HOUSING
Walter T. Hedlund, Beverly Hills, Calif., assignor to W. T. Hedlund Company, Los Angeles, Calif., a corporation of California
Filed July 17, 1961, Ser. No. 124,462
10 Claims. (Cl. 241—100.5)

This invention relates to a mount for a food waste disposer and to a housing for said disposer operatively associated with the mount.

An object of the present invention is to provide means of the character above referred to to quiet the operation of a waste disposer.

Another object of the invention is to provide a combined mount and enclosing housing for a waste disposer that quiets food-grinding noises both by absorption or deadening of the vibrations of the disposer and by absorption of the noises generated within the disposer.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 4 is an enlarged vertical sectional view through the middle of the device shown in FIGS. 1 and 2, the section being taken on the line 4—4 of FIG. 2.

Figure 1:
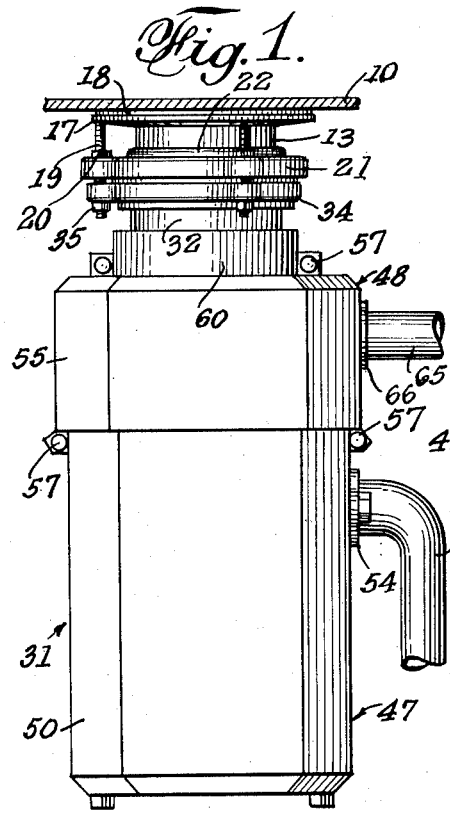
FIG. 1 is a front elevational view of a waste disposer provided with the present mount and housing, the same being shown in operative position extending downward from a sink or similar basin.
Figure 2:
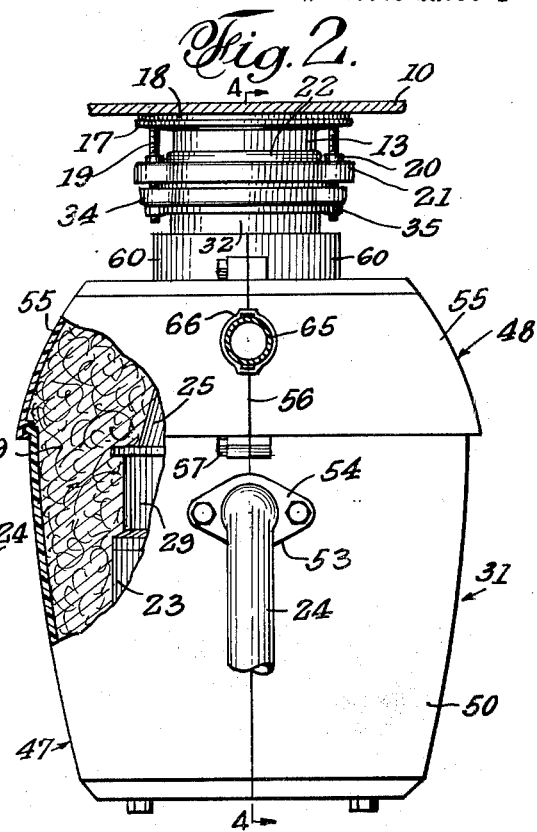
FIG. 2 is a side elevational view thereof with a portion of the housing broken away.
Figure 5:
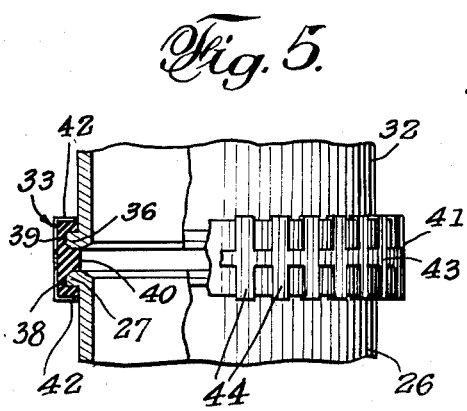
Figure 3:
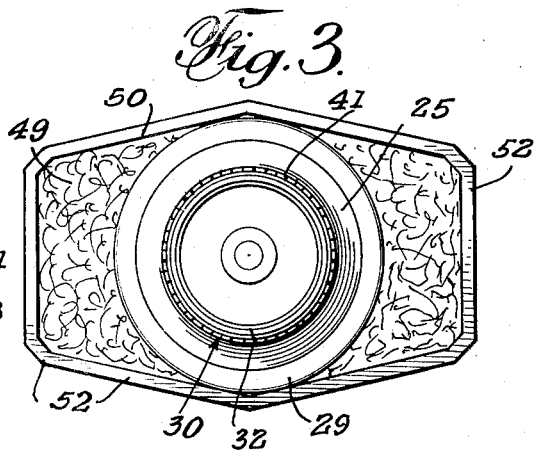
FIG. 3 is a plan view of the lower portion of the housing with a food disposer disposed therein provided with a mount according to the present invention.

FIG. 5, to the scale of FIG. 4, is a quarter-section side view of the present disposer mount.

The drawings show the usual bottom 10 of a sink or similar basin, and a sink flange 11 disposed in a hole 12 in said sink bottom, with a downwardly extending collar 13 having an inturned end flange 14 and a split retaining ring 15 in snap retention in a outer annular groove 16 in the wall of said collar. Said sink flange 11 is held fixedly in position by a sink ring 17 between which and the sink bottom 10 is disposed a sealing washer 18, and an upwardly-pressing set of screws 19 that are threadedly engaged in screw seats 20 in a bearing ring 21 loosely arranged around the collar 13 and having an annular seat 22 that bears on the retaining ring 15. Take-up on screws 19 causes the bearing ring 21 to bear down on the ring 15 and press upwardly on the sink ring 17. Hence, the sink flange 11 is held tightly against the sink bottom.

Also shown in the drawing is a typical food waste disposer that is here shown as having a cylindrical body 23 from which laterally extends a discharge conduit 24, an upper conical food intake hopper 25 that has an upper cylindrical collar 26 provided with an outturned flange 27. A water inlet 28 extends laterally from said hopper. In practice, the housing 23 encloses an electric motor or other prime mover and its upper portion, below the hopper, comprises a comminuting or grinding chamber 29.

The mentioned discharge conduit 24 drains said chamber of comminuted waste, as carried by the water supplied through the inlet 28.

According to the present invention, the above-described typical sink flange assembly and waste disposer are connected by a mount 30 to absorb or deaden vibrations generated in the disposer, thereby minimizing their transmission to the sink bottom 10 through the sink flange 11, and a noise-damping housing 31 is provided to enclose said disposer and is carried by the mount 30.

The mount 30 comprises, generally, an extension collar 32, a shock- and vibration-absorbing connector ring 33 to connect the collars 26 and 32 in a manner to suspend the disposer from collar 32, a mounting ring 34 cooperating with the screws 19 and nuts 35 on said screws and with a silencer 34a to connect said collar 32 to the bearing ring 21.

The collar 32 is provided with outturned end flanges 36 and 37 and constitutes a connection between the sink flange collar 13 and the disposer collar 26 that provides a passage for waste from the sink to the grinding chamber 29 of the disposer.

The connector ring 33 comprises a resilient non-metallic circlet that has two inner, annular grooves 38 and 39 that impart an E-shaped cross-section to said ring and in which respectively fit the flanges 27 and 36. The annular wall 40 between grooves 38 and 39 serves to separate the collars 26 and 32. Thus, movements of the disposer as imparted by shock and vibration cannot be transmitted to the collar 32 but rather are absorbed by the circlet.

Said connector ring 33 further comprises an outer metal liner 41 that not only encircles the outer cylindrical face of the non-metallic circlet of ring 33 but also has portions 42 that cover portions of the top and bottom faces of said circlet. The liner is formed of bendable metal that is wrapped around the circlet to enclose the same, as described and is here shown as having a band portion 43 with integral and longitudinally spaced vertical extensions 44 on the ends of which the portions 42 are integrally formed. It will be seen that the liner 41 imparts vertical stiffness to the otherwise compressible circlet.

The mounting ring 34 encircles the collar 32 below the upper flange 37 thereof and provides a seat for the silencer 34a which has a complement of radial flaps 45 that span across the waste passage. An inner annular groove 46 in said silencer receives the upper flange 37 of the extension collar 32, thereby suspending the latter collar from said silencer. Said silencer is advantageously made of a soft compressible non-metallic material similar to the material of the circlet 33, natural or synthetic rubber being exemplary.

Said silencer is clamped between the inturned end flange 14 of the collar 13 and the collar 32 with a force that is applied by take-up on the nuts 35 to draw the mounting ring 34 in an upward direction toward the bearing ring 21.

It will be clear from the foregoing that the disposer has a double shock- and vibration-deadening mount—the silencer 34a and the ring 34. Since the material being ground in chamber 29 is frequently subject to violent agitation that propels material upwardly toward the silencer 34a, the double deadening mounting means above described imparts a quietness of operation much to be desired. A single shock mount, such as silencer 34a, for instance, may dampen vibration and reduce noises but the disposer would tend to move under such vibration angularly, thereby causing the lower portion of the disposer to vibrate more than where the disposer is connected to the silencer. This excessive movement may strain plumbing connections and may, in time, entail repairs. The present construction so mounts the disposer that the same may vibrate with little or no tendency to move angularly, thereby minimizing strain on plumbing connections.

The housing 31 comprises, generally, a lower housing shell 47, a two-part upper housing shell 48, and a sound-deadening packing 49 within the housing around the disposer. Said housing shells 47 and 48 are advantageously made of thin-walled high-impact polystyrene or other fracture-resistant and hard synthetic plastic or resin.

The housing shell 47 is formed as a receptacle into which the lower portion of the disposer is housed, the same having suitably designed side walls 50 enclosing an interior space that is larger than the disposer, thereby affording space for fibre glass packing 49 around the disposer, a bottom flange wall 51 to engage the lower end of the disposer, and an upper, outturned peripheral flange 52. An opening 53 in the side of said shell 47 accommodates a flange 54 that secures the waste or drain conduit 24 to the grinding chamber 29.

The upper housing shell 48 comprises two similar parts 55 that, together, form an enclosure for the hopper 25, the collar 26 and the connector ring 33. Said parts join along a seam 56 and are connected by bolts or screws 57, generally, as shown. Said parts 55 are formed with inner peripheral grooves 58 at their bottom edges to receive the flange 52 of the lower housing shell 50, thereby, connecting the housing shells to entirely enclose the disposer except for the opening 59 in the flange wall 51 when the bolts or screws are tightened up.

Said shell parts 55 are each provided with a half collar 60 extending integrally from the top wall 61 of each part, the same cooperating to enclose the mount 30. A lower half flange 62 and an upper half flange 63 on each part 55 cooperate to enclose said mount above and below and provide a connection between the housing 31 and the mount 30 that provides a support that holds the housing around the disposer without actual connection of the disposer and housing. However, if desired, screws 64 may be used to connect the bottom flange 51 to the bottom of the disposer, but it will be clear that the connection between the upper portion of the housing 31 to the connector ring 33 allows vibration movement of the upper end of the disposer with minimum transmission thereof to the housing due to the resilient connection afforded by the ring 33. Packing 49 is provided with the upper housing shell, also.

In practice, a flexible hose 65 is connected to the inlet 28. In this instance a frame fitting 64 is clamped between the meeting edges of the parts 55 around said hose where the same extends into the housing.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. In a waste disposer structure, downwardly extending waste-passing means terminating in an open lower end, a waste disposer beneath said end and having an upper end to receive waste from the mentioned means, said ends being each provided with an outturned flange, a vibration-absorbing ring having inner annular grooves into which said flanges are disposed to connect said ends and space the same longitudinally, and a non-metallic housing enclosing said waste disposer and provided with an upper portion engaging around and enclosing said ring to provide a confining chamber therefor and annularly spaced from the mentioned lower end of the waste passing means and the upper end of the waste disposer.

2. In a waste disposer assembly according to claim 1, a bendable metal liner around said ring provided with portions to stiffen the ring vertically and with portions superposed over the opposite side faces of said ring.

3. In a waste disposer structure, downwardly extending waste-passing means terminating in an open lower end, a waste disposer beneath said end and having an upper end to receive waste from the mentioned means, said ends being each provided with an outturned flange, a vibration-absorbing ring having an E-sectional form and having inner annular grooves into which said flanges are disposed to connect said ends and space the same longitudinally, and a non-metallic housing enclosing said waste disposer and provided with an upper portion engaging around and enclosing said ring and annularly spaced from the mentioned lower and upper ends.

4. In a waste disposer structure, downwardly extending waste-passing means terminating in an open lower end, a waste disposer beneath said end and having an upper end to receive waste from the mentioned means, said ends being each provided with an outturned flange, a vibration-absorbing ring of unitary construction having inner annular grooves into which said flanges are disposed to connect said ends and space the same longitudinally, and a non-metallic housing enclosing said waste disposer and provided with an upper two-part housing shell terminating intermediate the ends of the disposer and provided with mating half-collar portions that engage around and enclose said ring, said half-collar portions being provided with spaced annular flanges that are annularly spaced from the mentioned lower and upper ends.

5. In a waste disposer assembly according to claim 4, a metal liner interposed between said ring and the portions of said mating half-collars that enclose said ring.

6. In a waste disposer assembly according to claim 4, an annular lower housing shell connected to the lower edge of the upper two-part housing shell.

7. In a waste disposer assembly according to claim 4, a lower housing shell connected to the lower edge of the upper two-part housing shell, the interior of said shells around the disposer containing a packing of fibre glass.

8. In combination, a fixed sink flange terminating in a downwardly extending tube, a non-metallic silencer disposed across the lower end of said tube, means carried by the tube to press said silencer tightly against said end, a metallic tubular extension depending from said silencer and provided with a lower outturned flange, a waste disposer having an upper outturned flange disposed beneath said flange on the tubular extension, a non-metallic ring having inner annular grooves in which said two outturned flanges reside in longitudinally spaced relation, a metal liner around said ring, and a non-metallic housing shell around the disposer and provided with a collar portion engaged around and enclosing the metal-lined non-metallic ring.

9. In combination, a fixed sink flange terminating in a downwardly extending tube, a non-metallic silencer disposed across the lower end of said tube, means carried by the tube to press said silencer tightly against said end, a metallic tubular extension depending from said silencer and provided with a lower outturned flange, a waste disposer having an upper outturned flange disposed beneath said flange on the tubular extension, a non-metallic ring having annular grooves in which said two outturned flanges reside in longitudinally spaced relation, a metal liner around said ring, a non-metallic housing shell around the disposer and provided with a collar portion engaged around the metal-lined non-metallic ring, and upper and lower longitudinally spaced inner flanges on said housing shell that engage the upper and lower face of the mentioned metal-lined ring and together with the collar portion enclose the metal-lined ring.

10. In a waste disposer structure having a fixed sink flange terminating in a downwardly extending tube provided with a lower outturned flange and having a waste disposer unit provided at its upper end with an outturned flange of the same size as the mentioned lower flange, a resilient non-metallic circlet having opposite parallel end faces and two similar longitudinally spaced inner, annular grooves into which said outturned flanges are fitted to space the disposer from the sink flange tube, and a metal liner encircling the outer face of said circlet and provided with a plurality of transverse, circumferentially spaced extensions that extend transversely of the outer face of the circlet and are bent to cover portions of the end faces of the circlet.

References Cited in the file of this patent

UNITED STATES PATENTS

| | | |
|---|---|---|
| 1,277,076 | Ireland | Aug. 27, 1918 |
| 2,250,117 | Noblitt et al. | July 22, 1941 |
| 2,421,014 | Coss et al. | May 27, 1947 |
| 2,584,948 | Weatherhead | Feb. 5, 1952 |
| 2,853,248 | Long | Sept. 23, 1958 |
| 2,909,333 | Shewmon et al. | Oct. 20, 1959 |
| 2,965,318 | Jordan | Dec. 20, 1960 |
| 2,977,054 | Hyde | Mar. 28, 1961 |

FOREIGN PATENTS

| | | |
|---|---|---|
| 522,902 | Belgium | Oct. 15, 1953 |